United States Patent
Horen et al.

(10) Patent No.: US 9,897,149 B2
(45) Date of Patent: Feb. 20, 2018

(54) TORQUE CONVERTER LOCKUP CLUTCH BACKING PLATE

(71) Applicant: ALLISON TRANSMISSION, INC., Indianapolis, IN (US)

(72) Inventors: Jezrah Horen, Fairland, IN (US); Michael Rietdorf, Indianapolis, IN (US); Thinh Nguyen, Carmel, IN (US)

(73) Assignee: Allison Transmissions, Inc., Indianapolis, IN (US)

( * ) Notice: Subject to any disclaimer, the term of this patent is extended or adjusted under 35 U.S.C. 154(b) by 0 days.

(21) Appl. No.: 15/043,878

(22) Filed: Feb. 15, 2016

(65) Prior Publication Data

US 2016/0238085 A1    Aug. 18, 2016

Related U.S. Application Data

(60) Provisional application No. 62/117,139, filed on Feb. 17, 2015.

(51) Int. Cl.
| | |
|---|---|
| *F16D 13/70* | (2006.01) |
| *F16H 45/02* | (2006.01) |
| *F16D 1/10* | (2006.01) |
| *F16D 25/0635* | (2006.01) |
| *F16D 3/06* | (2006.01) |

(52) U.S. Cl.
CPC ............. *F16D 13/70* (2013.01); *F16H 45/02* (2013.01); *F16D 3/06* (2013.01); *F16D 25/0635* (2013.01); *F16D 2001/103* (2013.01); *F16H 2045/021* (2013.01); *F16H 2045/0221* (2013.01); *F16H 2045/0294* (2013.01)

(58) Field of Classification Search
None
See application file for complete search history.

(56) References Cited

U.S. PATENT DOCUMENTS

| | | | |
|---|---|---|---|
| 6,688,441 B1 | 2/2004 | Arhab et al. | |
| 8,051,964 B2 * | 11/2011 | Olsen | F16H 41/24 192/212 |
| 2001/0011489 A1 * | 8/2001 | Fukunaga | F16H 45/02 74/730.1 |
| 2005/0126874 A1 | 6/2005 | Back et al. | |
| 2007/0246317 A1 * | 10/2007 | Tomiyama | F16H 45/02 192/3.29 |
| 2009/0078522 A1 | 3/2009 | Jung et al. | |
| 2009/0152067 A1 * | 6/2009 | Cmich | F16H 45/02 192/3.29 |
| 2012/0043173 A1 | 2/2012 | Jameson et al. | |

OTHER PUBLICATIONS

International Search Report and Written Opinion of the International Searching Authority; dated May 12, 2016; 14 pages.

* cited by examiner

*Primary Examiner* — Mark A Manley
(74) *Attorney, Agent, or Firm* — Taft Stettinius & Hollister LLP; Stephen F. Rost (57) ABSTRACT

A backing plate assembly includes a front cover and a rear cover. The front cover defines an inner surface and a front plane, and the rear cover terminates at a lip. A backing plate forms a body having an outer surface that terminates at a base portion. When the outer surface is coupled to the inner surface, the backing plate is rotationally but not axially coupled to the front cover. The lip contacts the base portion to define a maximum axial distance between the backing plate and the front plane.

16 Claims, 6 Drawing Sheets

TORQUE CONVERTER LOCKUP CLUTCH BACKING PLATE

RELATED APPLICATIONS

The present application claims the benefit of U.S. Provisional Application Ser. No. 62/117,139, filed on Feb. 17, 2015, the disclosure of which is hereby expressly incorporated by reference in its entirety.

FIELD OF THE DISCLOSURE

The present disclosure relates to a transmission system, and in particular to a lockup clutch assembly of a torque converter for the transmission system.

BACKGROUND

A torque converter is a fluid coupling device that is used to transfer rotating power from a power unit, such as an engine or electric motor, to a power-transferring device such as a transmission. A torque converter can have a clutch system to allow the torque converter to be selectable for either fluid coupling or mechanical coupling depending on the engagement of the clutch system. The transmission is an apparatus through which power and torque can be transmitted from a vehicle's power unit to a load-bearing device such as a drive axis. Conventional transmissions include a variety of gears, shafts, and clutches that transmit torque therethrough.

SUMMARY

In a first embodiment, a backing plate assembly includes a front cover and a rear cover, the front cover defining an inner surface and a front plane, and the rear cover terminating at a lip; and a backing plate forming a body having an outer surface that terminates at a base portion; wherein, when the outer surface is coupled to the inner surface, the backing plate is rotationally but not axially coupled to the front cover; further wherein, the lip contacts the base portion to define a maximum axial distance between the backing plate and the front plane.

In one example of this embodiment, the outer surface and the inner surface include splines. In a second example, the splines allow the backing plate to move axially relative to the front cover. In a third example, the front cover can be coupled to the rear cover at more than one axial distance from the front plane. In a fourth example, a clutch assembly is located between the front cover and the rear cover; wherein the location of the backing plate affects the engagement of the clutch assembly. In a fifth example, at least one bearing is disposed between the front cover and the rear cover; wherein the rear cover can be spaced axially from the front plane to set clearances for the bearing.

In another embodiment, a torque converter lockup clutch backing plate includes a backing plate assembly having a backing plate surface coupled to a splined outer wall; a front cover having a splined inner wall; a back cover having a lip; a damper having an outer surface; and a clutch assembly that mechanically couples the backing plate surface to the damper when the clutch assembly is in an engaged position; wherein, the splined outer wall rotationally couples the backing plate assembly to the splined inner wall; further wherein the backing plate assembly can move axially when the splined outer wall rotationally couples the backing plate assembly to the splined inner wall of the front cover.

In one example, the lip contacts a portion of the backing plate assembly to set a maximum axial distance the backing plate assembly can move from the front cover. In a second example, the back cover and the front cover can be coupled to one another at a plurality of different axial distances from one another. In a third example, the axial alignment of the front cover and the back cover changes the axial alignment of the backing plate assembly relative to the front cover. In a fourth example, tolerances of the clutch assembly are set by changing the axial alignment of the lip. In a fifth example, a piston is provided that is actuated to selectively engage the clutch assembly. In a sixth example, the piston applies force to the clutch assembly that is resisted by the backing plate through the lip.

In a third example, a method is provided for assembling a torque converter assembly. The method includes placing a nose hub on a build table so an axis of rotation is perpendicular to a level surface of the build table; axially aligning a front cover with the nose hub and placing the front cover onto the nose hub; coupling the front cover to the nose hub; placing a piston and at least one clutch plate or reaction plate into the front cover; placing a damper in the front cover in alignment with the clutch plate or reaction plate; aligning a backing plate with splines in the front cover and placing the backing plate into the front cover; placing a first bearing onto a back portion of the nose hub; axially aligning a turbine assembly with the nose hub and placing the turbine assembly against the first bearing; placing a second bearing onto a hub of the turbine assembly; axially aligning a stator assembly with the nose hub and placing the stator assembly on the second bearing; placing a third bearing onto a hub of the stator assembly; axially aligning a rear cover with the nose hub and placing the rear cover onto the third bearing; and setting clearances for a clutch assembly by lifting the rear cover a desired distance away from the front cover before coupling the rear cover to the front cover.

In one example of this embodiment, the desired distance is a distance that allows the clutch assembly to mechanically transfer torsional force when in an engaged position. In a second example, the desired distance is also a distance that allows the clutch assembly to be oriented in a disengaged state where torsional force will not be transferred through the clutch assembly. In a third example, the setting clearances for a clutch assembly step also includes setting clearances for the first, second, and third bearing. In a fourth example, the coupling the rear cover to the front cover step involves welding the rear cover to the front cover. In a fifth example, the torque converter is mounted to a transmission after the coupling the rear cover to the front cover step.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", an and the may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1:
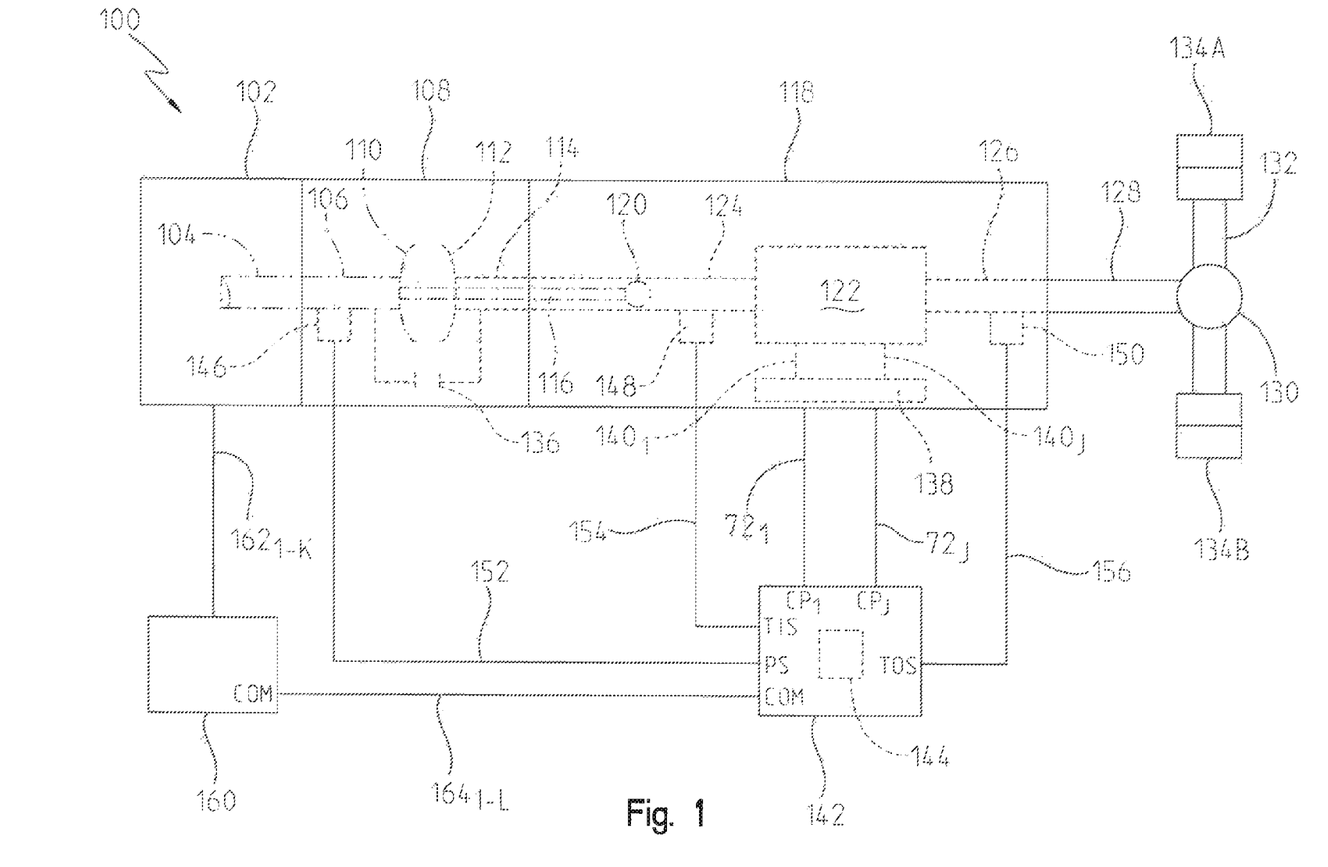
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the turbine shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link, Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Figure 2:
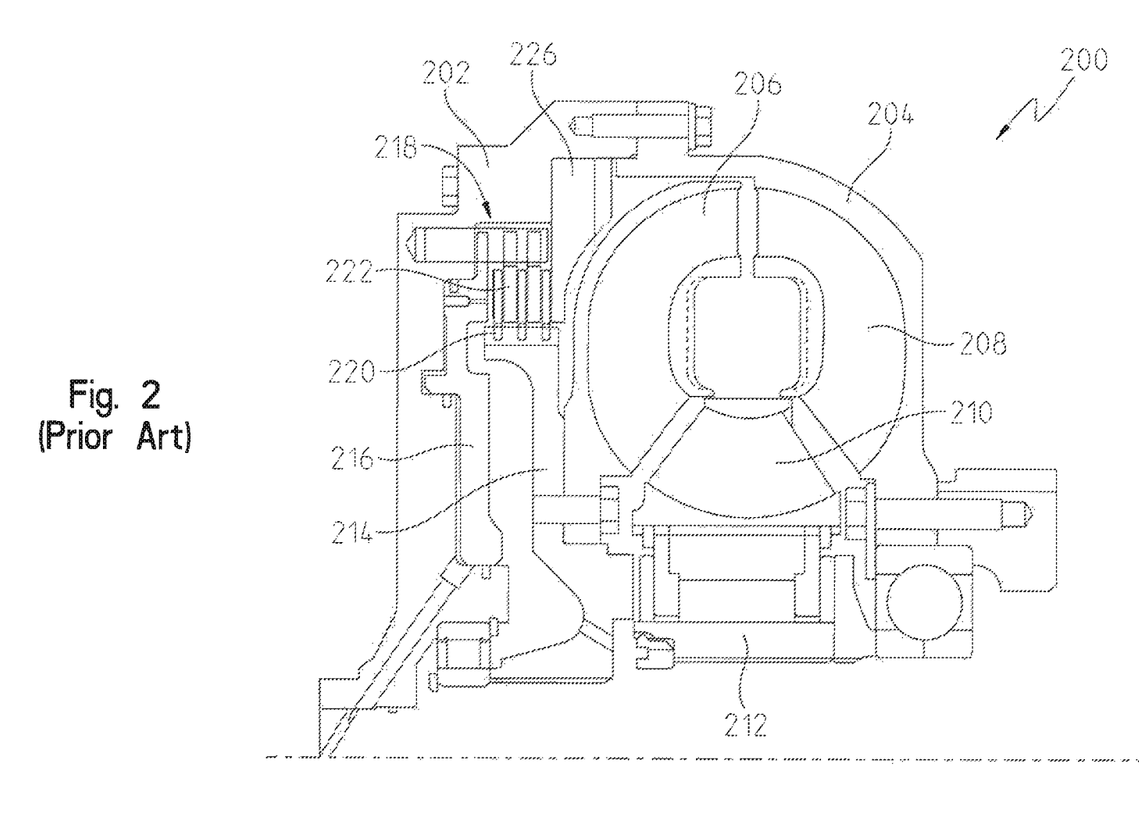
FIG. 2 is a top half cross-sectional view of a conventional torque converter.

Referring to FIG. 2, one embodiment is shown of a top half, cross-sectional view of a conventional torque converter 200. Torque converter 200 includes a front cover assembly 202 fixedly attached to a rear cover 204 or shell at a coupled location. In one example, the coupled location can include a bolted joint, a welded joint, or any other type of coupling means. The converter 200 includes a turbine assembly 206 with turbine blades, a shell, and a core ring. The converter 200 also includes a pump assembly 208 with impellor or pump blades, an outer shell, and a core ring.

A stator assembly 210 is axially disposed between the pump assembly 208 and the turbine assembly 206. The stator assembly 210 can include a housing, one or more stator blades, and a one-way clutch 212. The one-way clutch 212 may be a roller or sprag design as is commonly known in the art.

The torque converter 200 can include a clutch assembly 218 that transmits torque from the front cover 202 to a turbine hub 214. The clutch assembly 218 includes a piston plate 216, a backing plate 226, a plurality of clutch plates 220, and a plurality of reaction plates 222. The plurality of clutch plates 220 and reaction plates 222 can be splined to the turbine hub 214, which is bolted to a turbine assembly as shown in FIG. 2. The piston plate 216 can be hydraulically actuated to engage and apply the clutch assembly 218, thereby "hydraulically coupling" the turbine assembly 206 and pump assembly 208 to one another. Hydraulic fluid can flow through a dedicated flow passage in the torque converter 200 on a front side of the piston plate 216 to urge the plate 216 towards and into engagement with the clutch assembly 218. One skilled in the art can appreciate how this and other designs of fluid-coupling devices can be used for fluidly coupling an engine and transmission to one another.

Figure 3:
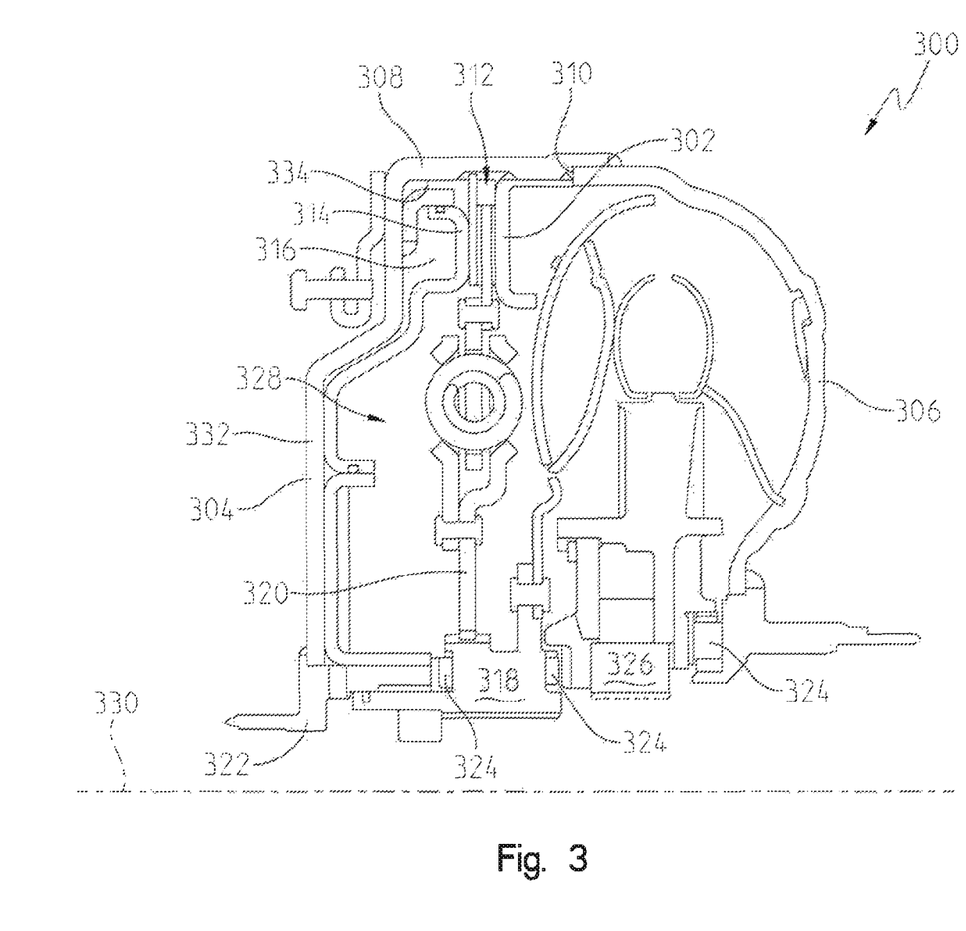
FIG. 3 is a top half cross-sectional view of a torque converter with a backing plate assembly as disclosed herein.

Referring now to FIG. 3, a top half, cross-sectional view of a torque converter 300 is shown. The torque converter 300 can substantially encompass at least one shaft (not shown) about an axis 330. A front cover 304 may be coupled to a rear cover 306 to partially define an interior region 328. The front cover 304 may be comprised of a front plate 332 that extends radially from a nose hub 322 to an outer wall 308. The outer wall 308 may be substantially tubular in shape and extend axially along a portion of the axis 330. The portions of the outer wall 308 and the front plate 332 shown in FIG. 3 may revolve 360 degrees about the axis 330 to partially define the interior region 328. The outer wall 308 may also have an inner surface 334 along the radially innermost portion of the outer wall 308. In one embodiment, the inner surface 334 may have splines (not shown) extending radially inward from the inner surface 334 towards the axis 330.

A backing plate 302 may be disposed in the interior region 328 and extend radially outward relative to the axis 330. The backing plate 302 may be slidably coupled to the front cover 304. In this embodiment, the outer wall 308 may have a splined inner surface 334 of the outer wall 308 that corresponds to a splined outer surface 402 (FIG. 4) of the backing plate 302. The backing plate 302 may fit at least partially within the interior region 328 of the front cover 304. Further, the splined inner surface 334 of the outer wall 308 can slidably couple with the splined outer surface 402 of the backing plate 302 to substantially restrict independent radial movement between the front cover 304 and the backing plate 302.

While the splined relationship may prevent radial movement between the front cover 304 and the backing plate 302, it may allow for at least a limited amount of axial movement of the backing plate 302 relative to the front cover 304. In one embodiment, the rear cover 306 may contact a portion of the backing plate 302 at a lip 310 when the torque converter 300 is fully assembled, as shown in FIG. 3.

A clutch assembly 312 may be partially located between a piston 314 and the backing plate 302. The piston 314 may be disposed in either an engaged or a disengaged position. In the engaged position, a cavity 316 behind the piston 314 may at least partially fill with a fluid (not shown). As fluid and hydraulic pressure builds in the cavity 316, the piston 314 may slide axially towards the backing plate 302. As the piston 314 contacts the clutch assembly 312, the clutch assembly 312 may move axially towards the backing plate 302. The backing plate 302 may also move axially until it contacts the lip 310 of the rear cover 306. The axial force applied by the piston 314 may be sufficiently opposed by the backing plate 302 to force the clutch assembly 312 into an engaged or lockup position.

While the clutch assembly 312 is described above as having limited axial movement, one skilled in the art will appreciate how the clutch assembly 312 may function without any substantial axial movement. For instance, instead of axial movement among the torque converter components, a force distribution may achieve substantially the same result. That is to say, the piston 314 may apply a force to the clutch assembly 312 that is resisted by the backing plate 302 through the lip 310 of the rear cover 306 without causing any substantial axial movement.

When the clutch assembly 312 is in the engaged position, the front cover 304 and a turbine hub 318 may be mechanically coupled to one another through the clutch assembly 312, thereby bypassing the need for fluid coupling of the torque converter 300. When the clutch assembly 312 is in the engaged position, the torsional loads input into the torque converter 300 through the front cover 304 are transferred through the splined outer wall 308 of the front cover 304 and into the splined outer surface 402 of the backing plate 302. The backing plate 302 may then transfer the torsional forces through the clutch assembly 312 and into a damper 320 that may be coupled to the turbine hub 318. Finally, the turbine hub 318 may transfer the torsional forces out of the torque converter 300 through the turbine shaft 114.

Figure 4:
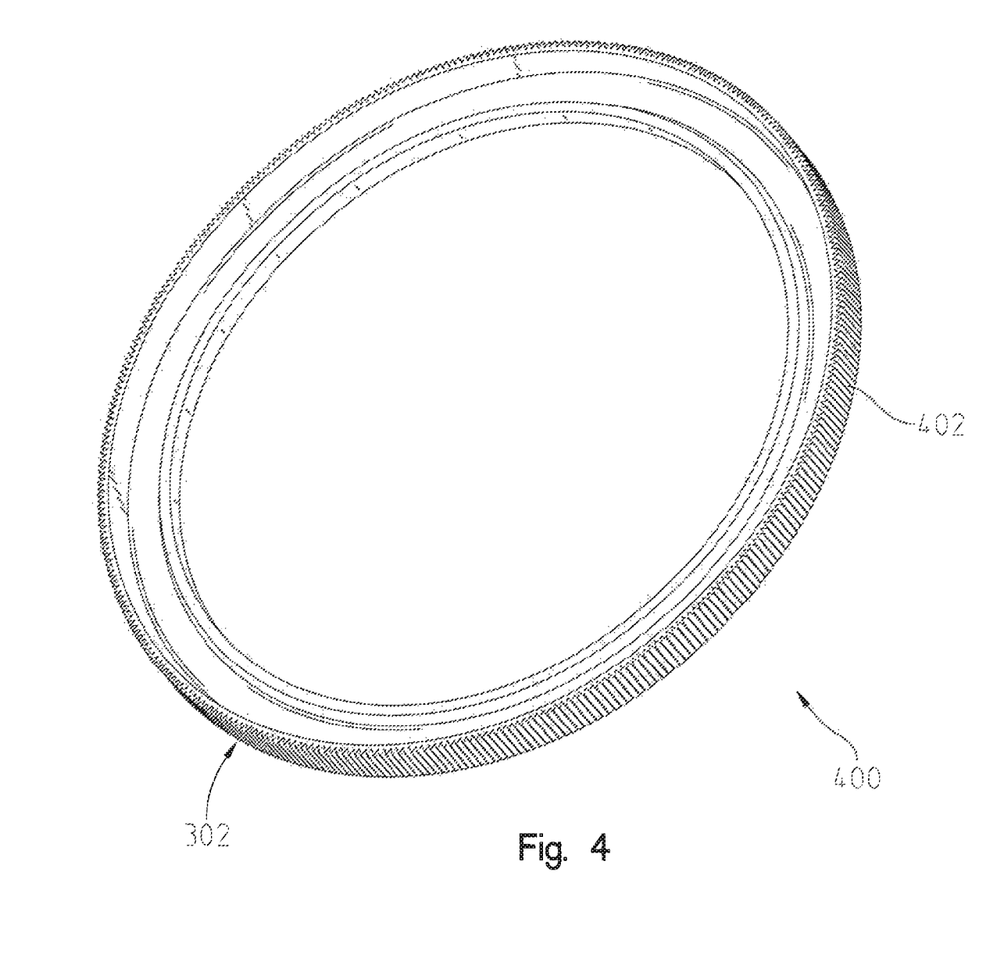
FIG. 4 is a perspective view of the backing plate assembly of FIG. 3.
Figure 5:
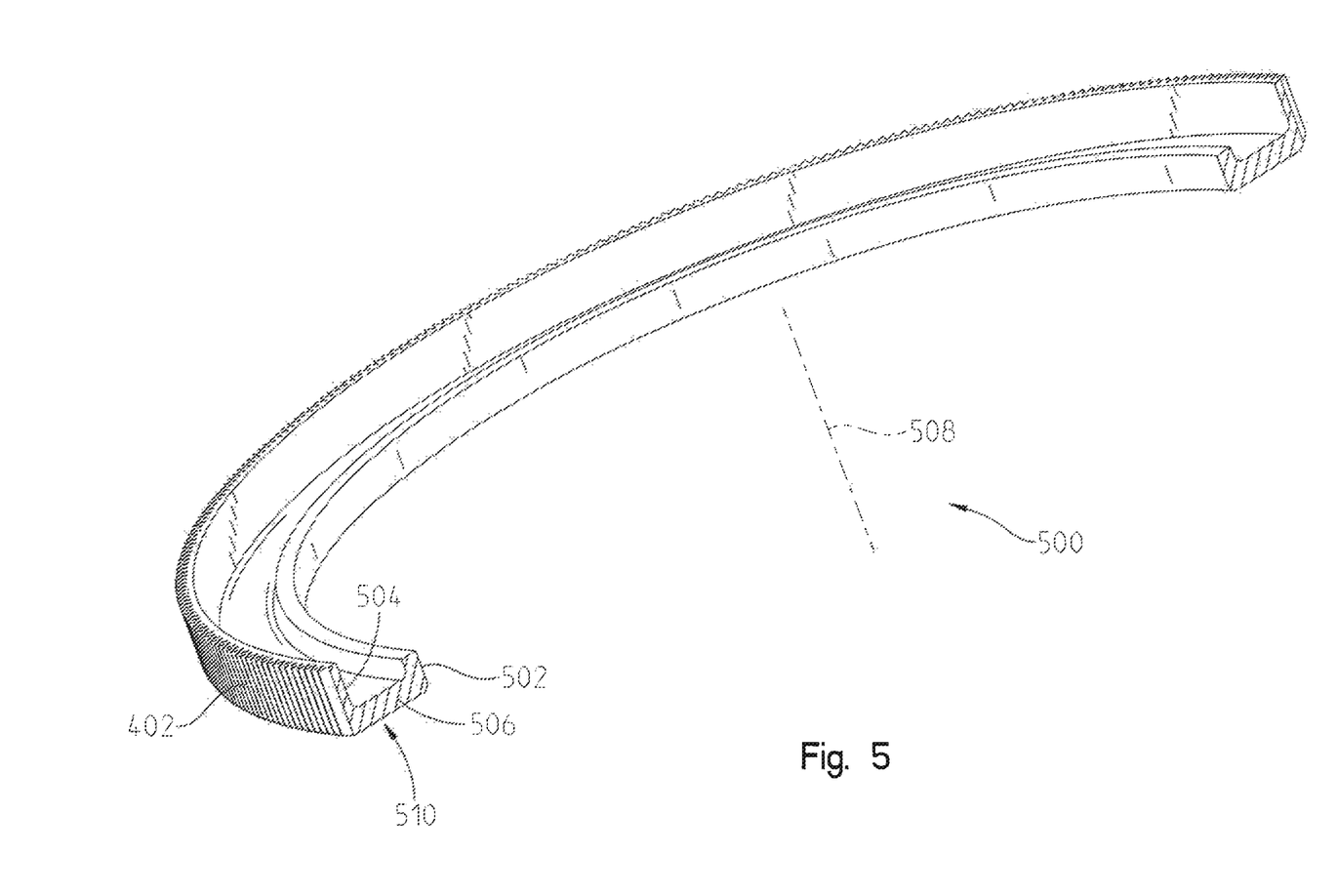
FIG. 5 is a partial cross-sectional perspective view of the backing plate assembly of FIG. 4.

A perspective view 400 of the backing plate 302 is shown in FIG. 4. Additionally, a perspective cross-sectional view 500 of the backing plate 302 is shown in FIG. 5. The backing plate 302 can be formed of substantially one material. The material may have a first edge 502, a second edge 504, and a base portion 506 that extends radially therebetween. The first edge 502 and the second edge 504 may be radially spaced from one another by the base portion 506. The first edge 502 and the second edge 504 may also be formed by a bend in the base portion 506. For instance, in one non-limiting example the second edge 504 may be bent a sufficient angle from the base portion 506 to allow the second edge 504 to be parallel with a rotational axis 508. In one embodiment, it may be advantageous to have a second edge that is parallel to the rotational axis 508 because it may allow for some axial movement of the backing plate 302 without affecting the engagement of the splined outer surface 402 and the splined inner surface 334 of the outer wall 308.

The first edge 502 may also be formed as a bend in the base portion 506 that results in a first edge 502 that is substantially parallel to the rotational axis 508. The first edge 502 bend may be utilized to add structural integrity to the backing plate 302 and should not be limited to a 90 degree bend. One skilled in the art can understand how the first edge 502 may be any plurality of angles in comparison to the base portion 506 without affecting the function of the backing plate 302. For example, the first edge 502 may be a 180 degree bend.

The base portion 506 may be sufficiently thick to resist substantial deformation when the clutch assembly 312 is in the engaged position. Further, a surface 510 of the base portion 506 may be sized to correspond with the components of the clutch assembly 312. In one embodiment, the surface 510 corresponds radially with a portion of the damper 320 that has a friction material coupled thereto. Further, the surface 510 may also include a friction material (not shown) to aid in the engagement of the clutch assembly 312. When the clutch assembly 312 is in the engaged position, the surface 510 of the base portion 506 may become mechanically coupled to the damper 320 through the friction material.

While the above disclosure for the backing plate 302 describes the base portion 506 that connects the first edge 502 and a second edge 504, this disclosure should not be limited to such a configuration. One skilled in the art will appreciate that other designs maybe used to achieve substantially the same result. For example, a support may be inserted to connect the terminal portion of the first edge 502 and the second edge 504. Further, the backing plate 302 may be formed of one solid piece that does not include any bends. In this embodiment, the cross-section of the backing plate 302 may be shaped like a right triangle, with the splined edge being a right angle to the base portion. One skilled in the art will understand how a plurality of designs similar to those disclosed may be used to achieve substantially the same result.

One advantage of the embodiment shown in FIG. 3 may be apparent during an assembly process of the torque converter 300. More specifically, the desired clearance for the clutch assembly 312 may be set prior to welding or otherwise coupling the front cover 304 to the rear cover 306. One method of assembly may involve stacking all of the components of the torque converter 300 on a building table (not shown) so the axis 330 is substantially perpendicular to the ground as shown by the block diagram 600 in FIG. 6.

Figure 6:
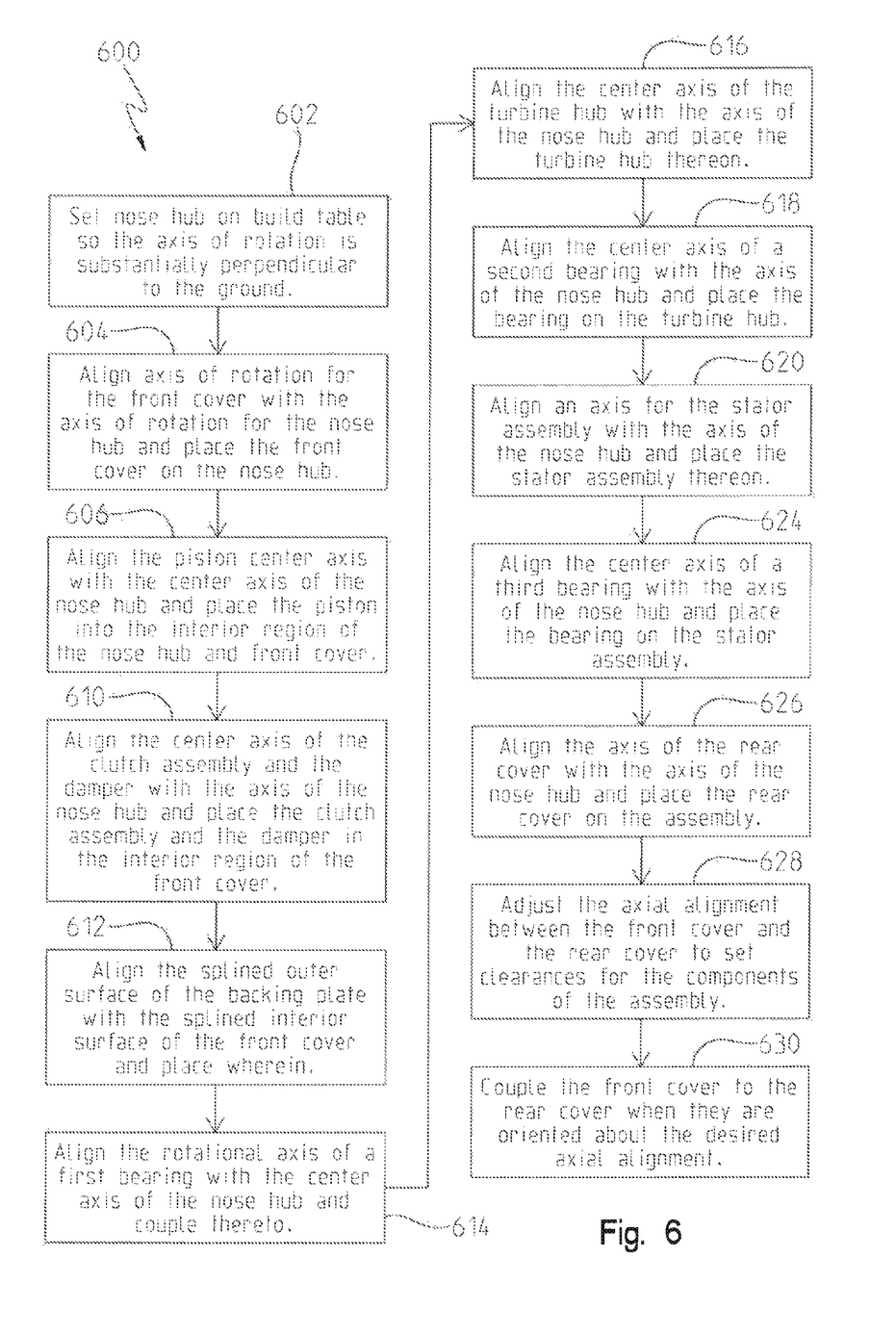
FIG. 6 is a flow diagram of a process for assembling a torque converter.

The method may involve setting the nose hub 322 on the build table 602. Next, the front cover 304 may be placed on the nose hub 322 and coupled thereto 604. The piston 314 may then be placed into a cavity created by the nose hub 322 and the front cover 606. The clutch assembly 312 and the damper 320 may then be placed into the front cover 610. Next, the splined outer surface 402 may be aligned with the splined inner surface 334 of the outer wall 308 and be placed therein 612. At least one bearing 324 may then be placed along the nose hub 614 before the turbine hub 318 is placed on and aligned with the nose hub 616. Another bearing 324 may be aligned with the turbine hub 618 before a stator assembly 326 may be aligned and placed therewith 620. A final bearing 324 may be placed along the stator assembly 624 before the rear cover 306 can be placed thereon 626 to substantially complete the assembly.

When the rear cover 306 is placed on the assembly, it may contact the bearing 324 while also contacting the lip 310 of the backing plate 302. The orientation of the torque converter on the build table may allow gravity to force the components into contact with one another. Further, the contact between the lip 310 and the backing plate 302 may compress the clutch assembly 312 against the piston 314.

Prior to welding or otherwise coupling the rear cover 306 to the front cover 304, the axial alignment between the front cover 304 and the rear cover 306 may be altered 628. In one non-limiting example, after the rear cover 306 has been placed on the torque converter assembly 300, gravity may force the components together as they sit on the build table. To alter the clearances between the internal components of the torque converter 300, the rear cover 306 may be moved axially away from the front cover 304 before being coupled thereto 630.

One of the many advantages to the backing plate 302 embodiment shown in FIG. 3 and described above is the ability of the manufacturer to set the clearances of the clutch assembly 312 or bearings 324. For instance, if the particular design requires specific clearances for the clutch assembly 312, the rear cover 306 can be coupled to the front cover 304 at an axial distance that would accommodate the desired clearances in the clutch assembly 312. Similarly, if the particular design requires specific clearances in the bearings 324, then the rear cover 306 may be coupled to the front cover 304 at an axial distance that accommodates the desired bearing 324 clearances.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

We claim:

1. A torque converter assembly, comprising: a front cover and a rear cover fixedly coupled to one another to define an interior there between, the front cover including an inner surface; a backing plate forming a body comprising an outer surface, a first edge, and a base portion extending from the first edge, the backing plate being disposed within the interior;

and a clutch assembly having a piston configured to selectively apply a force to the backing plate;

wherein, the backing plate is slidably coupled to the front cover to allow axial movement there between; wherein, the backing plate is disposed in at least a first position and a second position, the backing plate spaced from and not in contact with the rear cover in the first position, and the backing plate being in contact with the rear cover in the second position, wherein, the first edge is formed from a bend in the base portion.

2. The torque converter assembly of claim 1, wherein the outer surface and the inner surface include splines.

3. The torque converter assembly of claim 2, wherein the splines allow the backing plate to move axially relative to the front cover.

4. The torque converter assembly of claim 1, wherein the front cover can be coupled to the rear cover at more than one axial distance from a front plane defined by the front cover.

5. The torque converter assembly of claim 1, further wherein the clutch assembly is located between the front cover and the rear cover; wherein the location of the backing plate affects the engagement of the clutch assembly.

6. The torque converter assembly of claim 1, further comprising:

at least one bearing disposed between the front cover and the rear cover;

wherein the rear cover can be spaced axially from a front plane defined by the front cover to set clearances for the bearing.

7. The torque converter assembly of claim 1, wherein a distance between the first position and the second position defines a maximum axial distance of travel between the backing plate and the front cover.

8. The torque converter assembly of claim 1, wherein:

the rear cover terminates at a lip;

the backing plate comprising a second edge, the first edge and second edge being angled relative to the base portion; and the lip being in contact with the second edge in the second position to define a maximum axial distance between the backing plate and the front cover.

9. A torque converter assembly, comprising: a front cover of the assembly having a splined inner wall; a rear cover of the assembly having a lip, the front cover and rear cover being fixedly coupled to one another to define an interior; a backing plate assembly disposed in the interior and having a splined outer wall, a base portion, and a first edge; a damper disposed in the interior having an outer surface; and a clutch assembly being movably disposed in the interior between an engaged position and a disengaged position, the clutch assembly coupling the backing plate assembly to the damper when the clutch assembly is in the engaged position; wherein, the splined outer wall of the backing plate rotationally couples the backing plate assembly to the splined inner wall of the front cover to limit rotation of the backing plate assembly relative to the front cover; further wherein the backing plate assembly is slidably coupled to the front cover to move axially relative thereto between a first position and a second position;

further wherein, the first edge is formed from a bend in the base portion;

further comprising a piston that is actuated to selectively engage the clutch assembly;

wherein the piston applies force to the clutch assembly that is resisted by the backing plate assembly through the lip.

10. The torque converter assembly of claim 9, wherein the lip contacts a portion of the backing plate assembly to set the maximum axial distance the backing plate assembly moves from the front cover.

11. The torque converter assembly of claim 9, wherein the rear cover and the front cover can be coupled to one another at a plurality of different axial distances from one another.

12. The torque converter assembly of claim 11, wherein the axial alignment of the front cover and the rear cover changes the axial alignment of the backing plate assembly relative to the front cover.

13. The torque converter assembly of claim 9, wherein tolerances of the clutch assembly are set by changing the axial alignment of the lip.

14. The torque converter assembly of claim 9, wherein the lip contacts a portion of the backing plate assembly in the second position.

15. The torque converter assembly of claim 9, wherein the backing plate assembly is spaced from and not in contact with the lip in the first position.

16. The torque converter assembly of claim 9, further wherein the backing plate comprises:

a second edge formed from a bend in the base portion;

wherein, the second edge is spaced radially away from the first edge;

further wherein, the splined outer wall is formed in the second edge.

\* \* \* \* \*